N. M. JOHNSON.
CUTTING APPARATUS.
APPLICATION FILED SEPT. 20, 1919.
1,424,133.
Patented July 25, 1922.
3 SHEETS—SHEET 1.
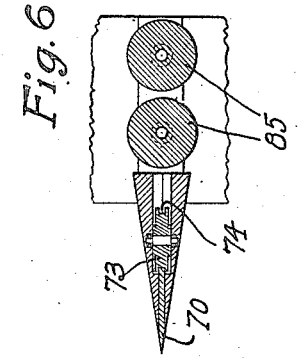
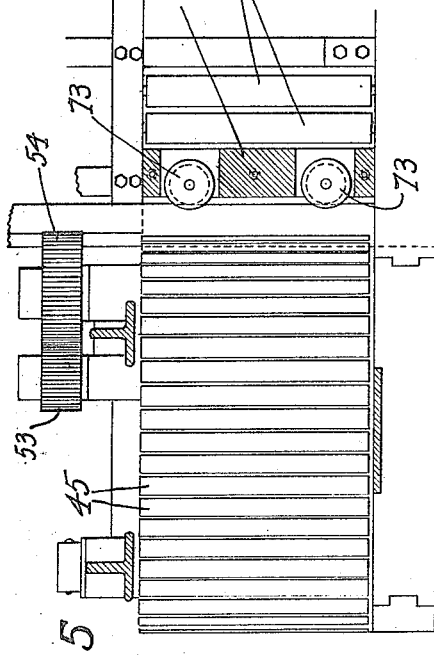
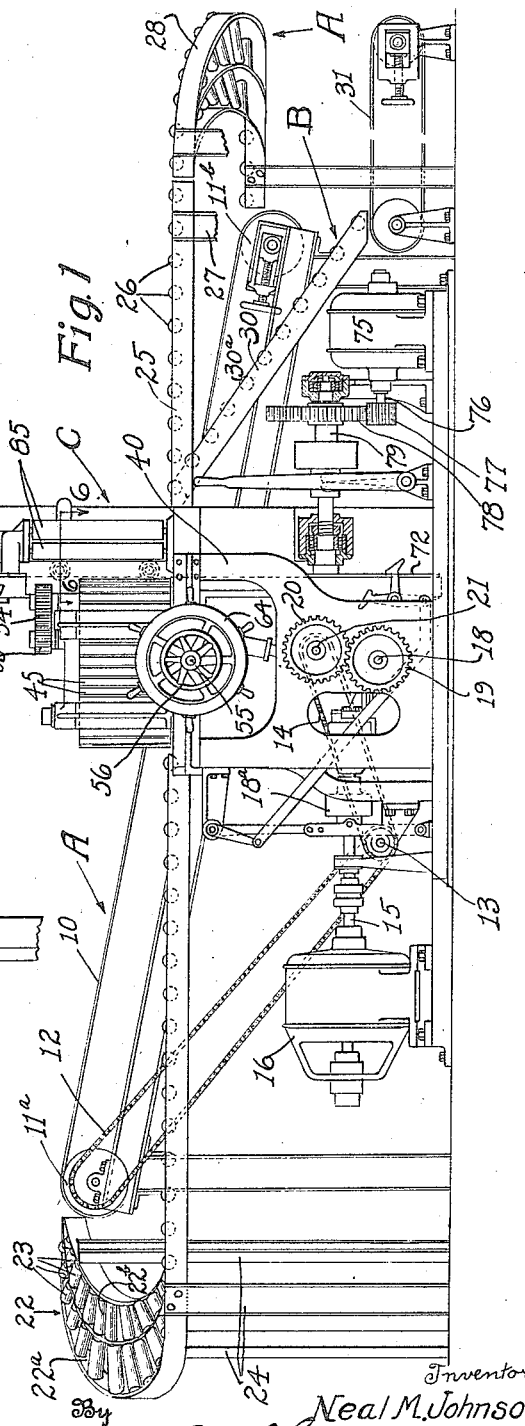
Inventor
Neal M. Johnson
Attorney N. M. JOHNSON.
CUTTING APPARATUS.
APPLICATION FILED SEPT. 20, 1919.
1,424,133.
Patented July 25, 1922.
3 SHEETS—SHEET 2.
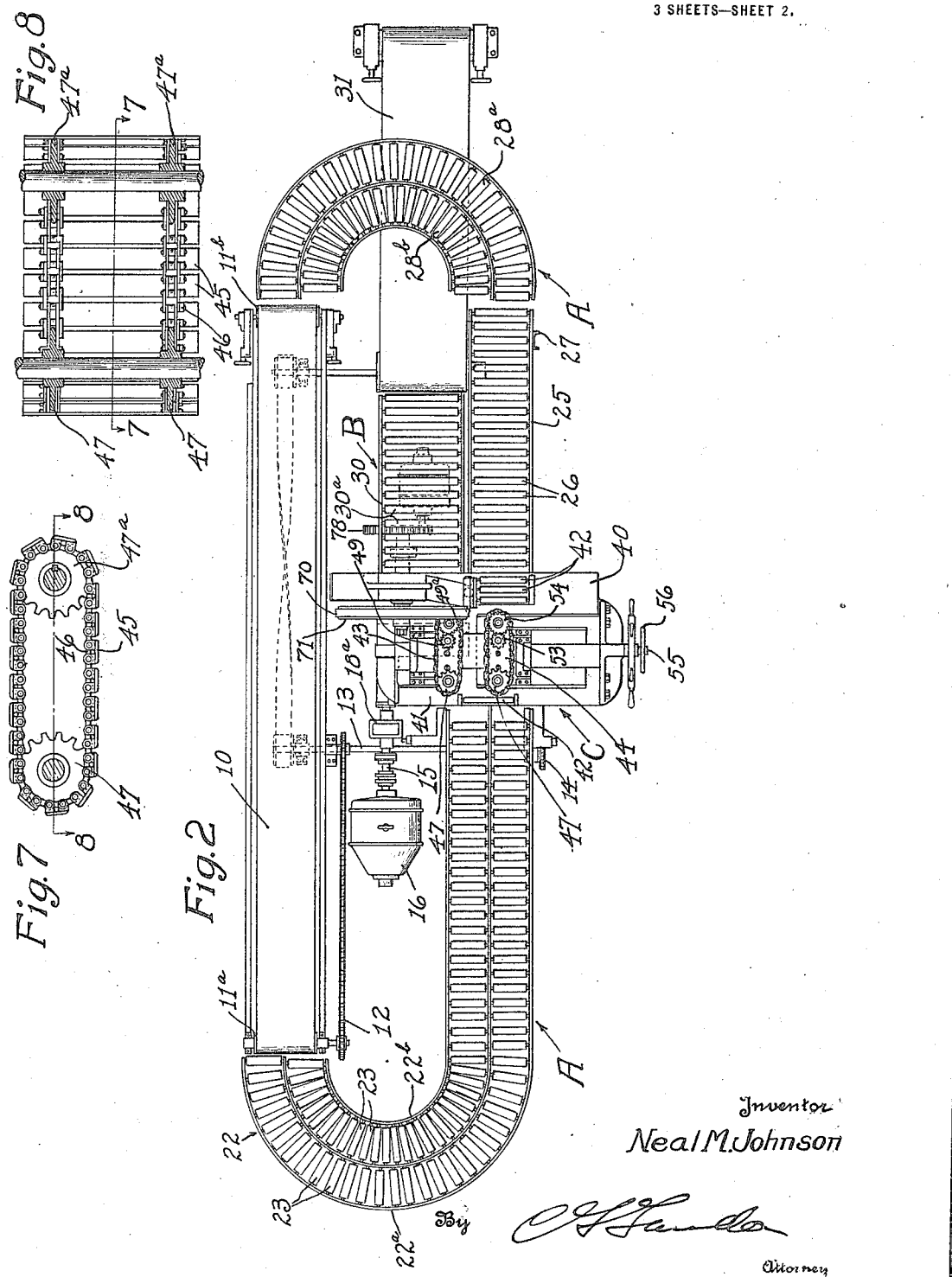
Inventor
Neal M. Johnson
By
Attorney

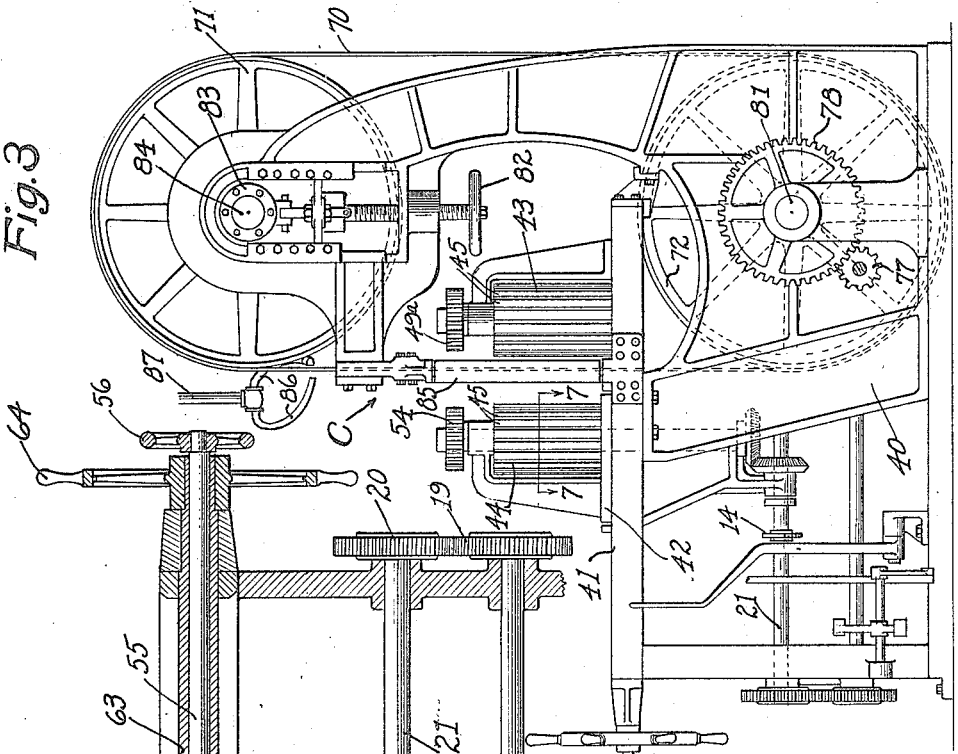
N. M. JOHNSON.
CUTTING APPARATUS.
APPLICATION FILED SEPT. 20, 1919.
1,424,133.
Patented July 25, 1922.
3 SHEETS—SHEET 3.
Inventor
Neal M. Johnson
By
his Attorney

UNITED STATES PATENT OFFICE.

NEAL M. JOHNSON, OF AKRON, OHIO, ASSIGNOR TO THE GOODYEAR TIRE & RUBBER COMPANY, OF AKRON, OHIO, A CORPORATION OF OHIO.

CUTTING APPARATUS.

1,424,133.  Specification of Letters Patent.  Patented July 25, 1922.

Application filed September 20, 1919. Serial No. 325,050.

*To all whom it may concern:*

Be it known that I, NEAL M. JOHNSON, a citizen of the United States, and resident of Akron, Ohio, have invented new and useful Improvements in Cutting Apparatus, of which the following is a specification.

My invention relates to a machine for slicing material, and has particular reference to a machine for slicing raw rubber as it comes from the plantations to the factories where it is to be utilized.

Crude rubber is received at the factories, where it is to be made into rubber articles of all descriptions, in large bundles made up of sheets, usually folded in layers and compactly pressed together in a hydraulic press.

In order to feed the material to the machinery for working it, such machinery being known as "mills," it is first necessary to reduce these bundles to relatively small pieces that can be readily fed to the mills. Hitherto it has been customary to pull apart the sheets of which the bundles are made up, by the use of hand hooks or the like. This method, however, is objectionable in that it is difficult and fatiguing to the operator, requiring, as it does, great exertion, and is, moreover, time consuming.

The principal object of my invention, therefore, is to provide a machine for sawing or slicing these bundles into slices sufficiently thin that they may be easily introduced between the rolls of the milling machine.

A further object of my invention is to provide a machine for conveying the bundles to a band-saw or slicer which slices or splits off a piece as the bundle is pressed into contact therewith, the slices being delivered to an accessible point, while the bundle from which the slice has been taken, is reconveyed to the saw which cuts off another slice, and so on until the entire bundle has been cut up.

A further object of my invention is to provide an apparatus which can be operated by a minimum number of operatives and will require but little, if any, skilled attention.

Other objects and advantages will appear as the description proceeds, and my invention is particularly defined in the claims hereto appended.

In the drawings, wherein I have illustrated the preferred embodiment of my invention:

Figure 1 is a side elevation of the whole apparatus embodying my invention;

Figure 2 is a plan view:

Figure 3 is an end elevation of the slicing mechanism proper;

Figure 4 is an end elevation, partly in section, of the mechanism for determining the width of slice;

Figure 5 is a side elevation, partly in section, showing the caterpillar tread device for presenting the crude rubber bundle to the band saw;

Figure 6 is a section through the band saw on the line 6—6 of Figure 1;

Figure 7 is a vertical section of the caterpillar tread, on the line 7—7 of Figures 3 and 8; and Figure 8 is a section on the line 8—8 of Figure 7.

Referring to the drawings, wherein similar parts are designated by like reference characters, the apparatus consists of three essential parts, namely, the bundle conveying mechanism A, the slice conveying mechanism B, and the adjustable slicing mechanism C.

*Bundle Conveyer A.*—The bundle conveying mechanism consists of an endless belt conveyer 10 arranged with one end higher than the other, and passing above and below a pair of rolls $11^a$ and $11^b$, the upper one $11^a$, being driven by a chain and sprocket drive 12. The belt may be supported intermediate the rolls $11^a$ and $11^b$ by idling rollers not shown. The chain and sprocket 12 are driven by a shaft 13, which in turn is driven by a chain and sprocket 14. The chain and sprocket 14 are operated by a main driving shaft 15 of a motor 16, through gear mechanism contained within a gear box 17, from which a driving shaft 18 extends, any well known form of clutch mechanism $18^a$ being interposed between shaft 15 and gear box 17. The end of the driving shaft 18 is provided with a spur gear 19 intermeshing with a similar gear 20 on shaft 21, on which also the sprocket wheel for the chain and sprocket 14 is mounted. See Figure 3. The shafts 18 and 21 are mounted in the frame of the slicing mechanism C as will more clearly appear below.

At the top of the belt conveyer 10, where it passes over roll $11^a$, and arranged so as to form an approximate continuation of the upper surface of the belt, is a gravity runway or conveyer 22 inclined for a portion of its length and composed of two sets or series 22ª and 22ᵇ of loosely mounted rollers 23 all of which are supported by standards 24 and by the frame of the slicing mechanism C. The runway 22 is curved so that a return bend is formed, whereby the bundle may slide down the inclined portion thereof and be pushed over the horizontal portion into contact with the slicing mechanism C. The two sets or series of rollers 22ª and 22ᵇ have been provided in order that there may be a sufficient rolling surface where the bundles of material make the turn, and to minimize the friction.

On the other side of the slicing mechanism C and in alinement therewith is arranged a substantially horizontal or slightly inclined receiving table or way 25, to which the bundle is delivered from the slicing mechanism. This table 25, like the runway 22, is also provided with rollers 26, to allow the bundle to be easily pushed along the same and is supported by a standard 27 and by the frame C. At the terminus of the table 25 is an inclined runway 28, curved similarly to the runway 22, and terminating at the receiving end of the belt conveyer 10, its surface merging with the surface thereof, thereby forming a substantially endless course for the material and being of approximately oval shape. The runway 28 also consists of two series or sets of rollers 28ª and 28ᵇ for the same purpose as rollers 22ª and 22ᵇ.

*Slice conveying mechanism B.*—The slice conveying mechanism comprises a comparatively short inclined runway 30 arranged inside the table 25 to receive the slices of material as they are cut off. The runway 30, like those previously described is also provided with rollers 30ª, and delivers the material on to a suitable conveyer 31, which I have herein illustrated as a belt-conveyer 31 extending outside the track and driven by pulley and belt connection with the driving shaft 13, as will be obvious. The purpose of the slice conveying mechanism is to deliver the slices to an accessible point somewhat outside the track where they may be readily handled. Instead of a belt conveyer 31, a table with rollers might be used with equal advantage.

*Slicing mechanism C.*—A frame 40 has a table surface 41 provided in the course of travel of the bundle, and having horizontal rollers 42, to permit the bundle to be readily advanced over the table 41. One of the principal features of my invention is the means for moving the bundle forward for contact with the cutting or slicing element, and such means consists of a pair of caterpillar tread devices 43 and 44, which are identical in structure, and are vertically arranged. The caterpillar 43 or 44 consists of an endless belt of treads 45, secured to links 46, so as to present a sprocket chain mechanism on the interior, which meshes with sprocket wheels 47, four sprocket wheels being, of course, provided for each of the caterpillars, and two of the sprocket wheels of each set, 47ª being positively driven. The driving mechanism for the caterpillar 43 consists of a shaft 48 extending from the gearing box 17, and having universal joints 48ª and 48ᵇ. The shaft 48 drives the pinion 49 which intermeshes with the spur gear 49ª on the same shaft on which the driving sprocket wheels 47ª are mounted. The caterpillar 44 is driven by the shaft 21, on which is keyed a bevel gear 50 intermeshing with a similar bevel gear 51 on a vertical shaft 52. A pinion 53 at the end of shaft 52 in turn drives a spur gear 54 on the shaft of which is secured the other driving sprocket wheel 47ᵇ. The shaft 21 is supported by a bearing formed in frame 40 and by a bearing carried by a movable plate described below.

Another important feature of my invention resides in the means for adjusting the caterpillar treads toward and away from each other in order that they may accommodate the decreasing thickness of each bundle as a slice is removed therefrom each time it passes around the course. This mechanism consists of a screw threaded shaft 55 journaled in the frame 40 and provided at its outer end with a hand wheel 56. The screw threaded shaft 55 serves to reciprocate a sliding block 57 which supports the caterpillar 43, and has a depending lug 58, provided with a correspondingly threaded aperture 59 receiving the screw threaded shaft 55. The caterpillar 44 is similarly supported by a sliding block 60 having a depending lug 61 through a screw threaded aperture 62 of which, passes a hollow screw threaded shaft 63. This screw threaded shaft 63 is arranged to telescope the shaft 55 and is provided at its outer end with a hand wheel 64 larger than the hand wheel 56 and concentric thereto. It will be seen that with the mechanism just described either caterpillar may be moved forward or backward independently of the other.

The mechanism for cutting or slicing the bundle consists of a band saw 70 which, for the purpose of cutting rubber, is preferably not provided with teeth, but is a thin sharp edged endless band passing over two wheels 71 and 72, which have parallel horizontal axes and a sufficiently wide edge to accommodate the band saw. The saw passes vertically through an opening in the table and near the forward ends of the caterpillar treads 43 and 44 as can best be seen in Figs.

1 and 2, and is guided, steadied, and prevented from bending at the point where it cuts the bundle, by two wheels or rolls 73 having each a recessed periphery 74 into which the back edge of the saw fits, these wheels 73 being supported in a frame 74ª. The lower wheel 72 is rotated by a motor 75, the main shaft 76 of which carries a pinion 77 meshing with a spur gear 78 on a shaft 79, conventional clutch mechanism and handle for operating the same being provided to drive the shaft 81, on which the wheel 72 is mounted. Adjusting means 82 is provided for moving the bearing 83 in which the shaft 84 of the upper wheel 71 is mounted.

A pair of vertical rollers 85 is also mounted in the frame 74 to retain the bundle in its proper course.

In order to facilitate the cutting of the rubber by the band saw 70, the latter is constantly wetted with water by means of two jets 86 arranged one on either side of the saw and leading from a source of supply 87, the water trickling down over the sides of the saw.

*Operation.*—The bundles of crude rubber are placed in succession on the bottom of the belt conveyer 10 by which they are carried to the top of the runway 22, down which they can be easily shoved by hand or by the bundles which are coming up the belt conveyer 10. They are then pushed along the horizontal portion of the runway 22, until they are brought into contact with the caterpillar treads 43 and 44. The treads are then properly adjusted by manipulation of the hand wheels 56 and 64, to fix the width of the slice to be removed, which is the distance between the tread 44 and the saw, and to adjust the space between the treads so that they will properly grip the bundle and move it forward into contact with the saw. A slice is thus cut from the bundle, the slice falling down upon the runway 30 and slides down that runway on to the conveyer 31, from which it can be loaded on to a truck or otherwise disposed of. The main bundle continues its course along the runways 25 and 28 until it is again taken up by the belt conveyer 10 and returned to the cutter for the removal of a second slice, and so on until the entire bundle has been cut up into relatively small slices.

From the foregoing it will be seen that I have provided a simple machine, for easily doing what has hitherto been done with great difficulty by hand, a machine that is adjustable to take any sized bundle and to cut off a slice of any predetermined thickness.

While I have illustrated the preferred embodiment of my invention, it will be understood that changes and modifications within the scope of the appended claims may be made without departing in any degree from the essence of my invention as defined in said claims.

What I claim is:

1. An apparatus of the character described comprising in combination an endless track, bundle conveying mechanism included in said track, means interposed in said track for cutting a slice of material from said bundle, and means for moving the bundle laterally of the track to gage the thickness of the slice to be cut.

2. An apparatus of the character described comprising in combination a track along which bundled material is adapted to move, means interposed between the ends of said track for cutting said material, means for urging forward said material into contact with said cutting means, said last means being adjustable to regulate the thickness of the slice to be cut and to accommodate bundles of different sizes.

3. An apparatus of the character described comprising in combination a track, said track being provided with rollers to minimize friction, and adapted to have bundled material moved over the surface thereof, a material cutting device arranged at a point along said track, means arranged along the side of a portion of said track to urge forward said material into contact with said cutting device, said means being adjustable laterally of said track.

4. An apparatus of the character described comprising in combination a track, said track being provided with rollers to minimize friction, and adapted to have bundled material moved over the surface thereof, an adjustable material cutting device arranged at a point along said track and means arranged along the side of a portion of said track to urge forward said material into contact with said cutting device.

5. An apparatus of the character described comprising in combination a track adapted to have bundled material moved over the surface thereof, a material cutting device arranged at a point along said track, and a caterpillar tread anterior to said cutting device to engage and urge forward said material into contact with said cutting device.

6. In a mechanism for slicing resilient material, a table, a plurality of vertically disposed relatively spaced caterpillar elements adapted in operation to grasp and transport the material upon the table, a vertically disposed endless cutting element operatively arranged to cut intermediate the caterpillars, and means for independently adjusting each caterpillar laterally of the cutting element to receive different widths of material and to vary the thickness of the slice to be cut.

7. An apparatus of the character described comprising in combination a track adapted to have bundled material moved over the surface thereof, a material cutting device arranged at a point along said track, and a pair of caterpillar treads to engage and urge forward said material into contact with said cutting device, said treads being adjustable with respect to said cutting device.

8. An apparatus of the character described comprising in combination a track adapted to have bundled material moved over the surface thereof, a material cutting device arranged at a point along said track, and a pair of adjustable caterpillar treads to engage and urge forward said material into contact with said cutting device.

9. An apparatus of the character described comprising in combination a track adapted to have bundled material moved over the surface thereof, a power driven material cutting device arranged at a point along said track, a caterpillar tread anterior to said cutting device, to engage and urge forward said material into contact with said cutting device, and means for independently operating said caterpillar tread.

10. An apparatus of the character described comprising in combination an endless track, said track including as a part thereof a belt conveyer, means for operating said belt conveyer, means located at a point along said track for cutting material moved along said track, and means for moving the material laterally of said track.

11. In a mechanism for slicing resilient material, a table, a plurality of vertically disposed relatively spaced caterpillar elements adapted in operation to grasp and transport the material upon the table, a vertically disposed endless cutting element operatively arranged to cut intermediate the caterpillars, means for independently adjusting each caterpillar laterally of the cutting element to receive different widths of material and to vary the thickness of the slice to be cut, and a common drive mechanism for operating each caterpillar adapted to permit in operation the aforesaid independent adjustment.

12. In an apparatus of the character described, a bundle impelling and slicing mechanism comprising an adjustable caterpillar tread, the tread surfaces of which are arranged in vertical planes and a power driven cutting device posterior to said tread and into contact with which said bundle is forced.

13. In an apparatus of the character described, a bundle impelling and slicing mechanism comprising a plurality of cooperating caterpillar treads, the tread surfaces of which travel in vertical planes, said caterpillars being independently adjustable to determine the width of the slice to be removed and to accommodate the thickness of said bundle and a power driven cutting device posterior to said caterpillars and into contact with which said bundle is forced by said caterpillars.

14. In an apparatus of the character described, a bundle impelling and slicing mechanism comprising a plurality of cooperating caterpillar treads disposed one opposite the other and the tread surfaces of which travel in vertical planes, said caterpillars being independently adjustable toward and away from each other, and a power driven cutting device posterior to said caterpillars and into contact with which said bundle is forced by said caterpillars.

In witness whereof, I have hereunto signed my name in the presence of two subscribing witnesses.

NEAL M. JOHNSON.

Witnesses:
J. E. KEATING,
PHILIP E. BARNES.